(12) United States Patent
Huang et al.

(10) Patent No.: US 11,915,126 B2
(45) Date of Patent: Feb. 27, 2024

(54) LOW POWER HARDWARE ARCHITECTURE FOR A CONVOLUTIONAL NEURAL NETWORK

(71) Applicant: Recogni Inc., San Jose, CA (US)

(72) Inventors: Jian hui Huang, Los Altos, CA (US); James Michael Bodwin, Cupertino, CA (US); Pradeep R. Joginipally, San Jose, CA (US); Shabarivas Abhiram, Mountain view, CA (US); Gary S. Goldman, Los Altos, CA (US); Martin Stefan Patz, Bavaria (DE); Eugene M. Feinberg, San Jose, CA (US); Berend Ozceri, Los Gatos, CA (US)

(73) Assignee: Recogni Inc., San Jose, CA (US)

( * ) Notice: Subject to any disclaimer, the term of this patent is extended or adjusted under 35 U.S.C. 154(b) by 621 days.

(21) Appl. No.: 16/948,164

(22) Filed: Sep. 4, 2020

(65) Prior Publication Data

US 2022/0076104 A1 Mar. 10, 2022

(51) Int. Cl.
*G06N 3/04* (2023.01)
*G06N 3/06* (2006.01)
*G06N 3/063* (2023.01)
*G06F 7/50* (2006.01)
(Continued)

(52) U.S. Cl.
CPC ............. *G06N 3/063* (2013.01); *G06F 7/50* (2013.01); *G06F 7/5443* (2013.01); *G06N 3/0464* (2023.01)

(58) Field of Classification Search
CPC .............................. G06N 3/063; G06N 3/0464
See application file for complete search history.

(56) References Cited

U.S. PATENT DOCUMENTS

| 10,373,050 | B2 | 8/2019 | Lin et al. |
| 10,528,321 | B2 | 1/2020 | Bittner et al. |
| 10,621,486 | B2 | 4/2020 | Yao |

(Continued)

OTHER PUBLICATIONS

Zhang, Heshan, et al. "A Block-Floating-Point Arithmetic Based FPGA Accelerator for Convolutional Neural Networks." 2019 IEEE Global Conference on Signal and Information Processing (GlobalSIP). IEEE, 2019. (Year: 2019).*

(Continued)

*Primary Examiner* — Hal Schnee
(74) *Attorney, Agent, or Firm* — Ascenda Law Group, PC

(57) ABSTRACT

Dynamic data quantization may be applied to minimize the power consumption of a system that implements a convolutional neural network (CNN). Under such a quantization scheme, a quantized representation of a 3×3 array of m-bit activation values may include 9 n-bit mantissa values and one exponent shared between the n-bit mantissa values (n<m); and a quantized representation of a 3×3 kernel with p-bit parameter values may include 9 q-bit mantissa values and one exponent shared between the q-bit mantissa values (q<p). Convolution of the kernel with the activation data may include computing a dot product of the 9 n-bit mantissa values with the 9 q-bit mantissa values, and summing the shared exponents. In a CNN with multiple kernels, multiple computing units (each corresponding to one of the kernels) may receive the quantized representation of the 3×3 array of m-bit activation values from the same quantization-alignment module.

5 Claims, 15 Drawing Sheets

(51) Int. Cl.
  *G06F 7/544* (2006.01)
  *G06N 3/0464* (2023.01)

(56) References Cited

U.S. PATENT DOCUMENTS

| | | | |
|---|---|---|---|
| 11,599,181 B1* | 3/2023 | Nair | G06F 17/16 |
| 2018/0157465 A1 | 6/2018 | Bittner et al. | |
| 2018/0285736 A1 | 10/2018 | Baum et al. | |
| 2019/0294413 A1* | 9/2019 | Vantrease | G06F 7/5095 |
| 2020/0210838 A1 | 7/2020 | Lo et al. | |
| 2020/0264876 A1* | 8/2020 | Lo | G06N 3/084 |
| 2020/0302330 A1* | 9/2020 | Chung | G06F 7/4876 |
| 2021/0248456 A1* | 8/2021 | Guo | G06N 3/045 |

OTHER PUBLICATIONS

Wei, Xuechao, et al. "Automated systolic array architecture synthesis for high throughput CNN inference on FPGAs." Proceedings of the 54th Annual Design Automation Conference 2017. 2017. (Year: 2017).*

Andri; et al., "YodaNN: An Architecture for Ultra-Low Power Binary-Weight CNN Acceleration", Cornell University, Feb. 24, 2017, arXiv:1606.05487v4 [cs.AR], 14 pgs.

Cavigelli; et al., "Origami: A 803 GOp/s/W Convolutional Network Accelerator", Cornell University, Jan. 19, 2016, arXiv: 1512.04295v2 [cs.CV], 14 pgs.

De Bruin; et al., "Quantization of constrained processor data paths applied to convolutional neural networks", Proceedings—21st Euromicro Conference on Digital System Design, DSD 2018 (pp. 357-364).

De Bruin; et al., "Quantization of Deep Neural Networks for Accumulator-constrained Processors", Cornell University, Apr. 24, 2020, arXiv:2004.11783v1 [cs.CV], 20 pgs.

Drumond; et al., "Training DNNs with Hybrid Block Floating Point", Cornell University, Dec. 2, 2018, arXiv: 1804.01526v4 [cs.LG], 11 pgs.

Gennari; et al., "DSConv: Efficient Convolution Operator", The IEEE International Conference on Computer Vision (ICCV), 2019, pp. 5148-5157.

Gysel; et al., "Hardware-Oriented Approximation of Convolutional Neural Networks", Cornell University, Oct. 20, 2016, arXiv: 1604.03168v3 [cs.CV], 8 pgs.

Lian; et al., "High-Performance FPGA-Based CNN Accelerator With Block-Floating-Point Arithmetic", IEEE Transactions on Very Large Scale Integration (VLSI) Systems, vol. 27, No. 8, Aug. 2019, pp. 1874-1885.

Lu; et al., "Training Deep Neural Networks Using Posit Number System", Cornell University, Sep. 6, 2019, arXiv: 1909.03831v1 [cs.LG], 6 pgs.

Mei; et al., "A 200MHZ 202.4GFLOPS@10.8W VGG16 Accelerator in Xilinx VX690T", 2017 IEEE Global Conference on Signal and Information Processing (GlobalSIP), Nov. 14-16, 2017, 5 pgs.

Moons; et al., "DVAFS: Trading Computational Accuracy for Energy Through Dynamic-Voltage-Accuracy-Frequency-Scaling", Design, Automation and Test in Europe (DATE), 2017, pp. 488-493.

Pagliari; et al., "Dynamic Bit-width Reconfiguration for Energy-Efficient Deep Learning Hardware", ISLPED '18, Jul. 23-25, 2018, Seattle, WA, 6 pgs.

Reagen; et al., "Minerva: Enabling Low-Power, Highly-Accurate Deep Neural Network Accelerators", 2016 ACM/IEEE 43rd Annual International Symposium on Computer Architecture, pp. 267-278.

Song; et al., "Computation Error Analysis of Block Floating Point Arithmetic Oriented Convolution Neural Network Accelerator Design", The Thirty-Second AAAI Conference on Artificial Intelligence (AAAI-18), 2018, pp. 816-823.

Zender, CS, "Bit Grooming: Statistically accurate precision-preserving quantization with compression, evaluated in the netCDF Operators (NCO, v4.4.8+)", Geoscientific Model Development, Sep. 19, 2016, 9(9):3199-3211.

Choo; et al., "Complex Block Floating-Point Format with Box Encoding For Wordlength Reduction in Communication Systems", arxiv.org, Cornell University Library, NY, arXiv:1705.05217v2 [cs.IT], Oct. 25, 2017, 6 pgs.

Drumond; et al., "End-to-End DNN Training with Block Floating Point Arithmetic", arxiv.org, Cornell University Library, NY, arXiv:1804.01526v2 [cs.LG], Apr. 9, 2018, 9 pgs.

Fan; et al., "Reconfigurable Acceleration of 3D-CNNs for Human Action Recognition with Block Floating-Point Representation", 2018 28th International Conference on Field Programmable Logic and Application (FPL), IEEE, Aug. 27, 2018, pp. 287-294.

International Search Report and Written Opinion dated Dec. 23, 2021, from the ISA/European Patent Office, for International Patent Application No. PCT/US2021/048078 (filed Aug. 27, 2021), 15 pgs.

Köster; et al., "Flexpoint: An Adaptive Numerical Format for Efficient Training of Deep Neural Networks", COR (ArXiv), ArXiv: 1711.02213v1 [cs.LG], Nov. 6, 2017, 14 pgs.

Song; et al., "Computation Error Analysis of Block Floating Point Arithmetic Oriented Convolution Neural Network Accelerator Design", arxiv.org, Cornell University Library, NY, arXiv: 1709.0776v2 [cs.LG], Nov. 24, 2017, 8 pgs.

International Preliminary Report on Patentability dated Dec. 7, 2022, from the IPEA/European Patent Office, for International Patent Application No. PCT/US2021/048078 (filed Aug. 27, 2021), 48 pgs.

Written Opinion of the International Preliminary Examining Authority dated Jul. 14, 2022, from the IPEA/European stent Office, for International Patent Application No. PCT/US2021/048078 (filed Aug. 27, 2021), 8 pgs.

\* cited by examiner

| Before Quantization | After Quantization | After Factorization | After Alignment |
|---|---|---|---|
| $2^{11} + 2^8 + 2^2$ | $2^{11} + 2^8$ | $2^5(2^6 + 2^3)$ | $2^6 + 2^3$ |
| $2^{12} + 2^8 + 2^5$ | $2^{12} + 2^8 + 2^5$ | $2^5(2^7 + 2^3 + 2^0)$ | $2^7 + 2^3 + 2^0$ |
| $2^{10} + 2^5 + 2^1$ | $2^{10} + 2^5$ | $2^5(2^5 + 2^0)$ | $2^5 + 2^0$ |
| $2^9 + 2^7 + 2^6$ | $2^9 + 2^7 + 2^6$ | $2^5(2^4 + 2^2 + 2^1)$ | $2^4 + 2^2 + 2^1$ |
| $2^6 + 2^5$ | $2^6 + 2^5$ | $2^5(2^1 + 2^0)$ | $2^1 + 2^0$ |
| $2^3 + 2^0$ | 0 | 0 | 0 |
| $2^{12} + 2^3$ | $2^{12}$ | $2^5(2^7)$ | $2^7$ |
| $2^7 + 2^5 + 2^0$ | $2^7 + 2^5$ | $2^5(2^2 + 2^0)$ | $2^2 + 2^0$ |
| $2^{10} + 2^8$ | $2^{10} + 2^8$ | $2^5(2^5 + 2^3)$ | $2^5 + 2^3$ |

After Alignment column divided by $2^5$.

FIG. 5A

| Before Quantization | After Quantization | After Factorization | After Alignment |
|---|---|---|---|
| $2^{11} + 2^8 + 2^2$ | $2^{11} + 2^8$ | $2^{12}(2^{-1} + 2^{-4})$ | $2^{-1} + 2^{-4}$ |
| $2^{12} + 2^8 + 2^5$ | $2^{12} + 2^8 + 2^5$ | $2^{12}(2^0 + 2^{-4} + 2^{-7})$ | $2^0 + 2^{-4} + 2^{-7}$ |
| $2^{10} + 2^5 + 2^1$ | $2^{10} + 2^5$ | $2^{12}(2^{-2} + 2^{-7})$ | $2^{-2} + 2^{-7}$ |
| $2^9 + 2^7 + 2^6$ | $2^9 + 2^7 + 2^6$ | $2^{12}(2^{-3} + 2^{-5} + 2^{-6})$ | $2^{-3} + 2^{-5} + 2^{-6}$ |
| $2^6 + 2^5$ | $2^6 + 2^5$ | $2^{12}(2^{-6} + 2^{-7})$ | $2^{-6} + 2^{-7}$ |
| $2^3 + 2^0$ | 0 | 0 | 0 |
| $2^{12} + 2^3$ | $2^{12}$ | $2^{12}(2^0)$ | $2^0$ |
| $2^7 + 2^5 + 2^0$ | $2^7 + 2^5$ | $2^{12}(2^{-5} + 2^{-7})$ | $2^{-5} + 2^{-7}$ |
| $2^{10} + 2^8$ | $2^{10} + 2^8$ | $2^{12}(2^{-2} + 2^{-4})$ | $2^{-2} + 2^{-4}$ |

LOW POWER HARDWARE ARCHITECTURE FOR A CONVOLUTIONAL NEURAL NETWORK

FIELD OF THE INVENTION

The present invention relates to a hardware architecture for reducing the power consumption of a convolutional neural network (CNN), and more particularly relates to the application of a dynamic data quantization scheme to the hardware architecture of a CNN.

BACKGROUND

Today, convolutional neural networks (CNNs) are widely used for performing image recognition, object recognition and image segmentation, among other tasks. While having numerous applications, neural networks require intensive computational processing, which can lead to high power consumption. Described herein is a hardware architecture for reducing the power consumption of a CNN.

SUMMARY OF THE INVENTION

In accordance with one embodiment of the invention, a dynamic data quantization scheme is used to minimize the power consumption of a convolutional neural network (CNN). Data quantization reduces the bit width of data signals, and accordingly reduces the power consumption. A tradeoff, however, of data quantization is the reduced numerical precision of the quantized values. A particular method of data quantization (i.e., dynamic data quantization) is employed to minimize the loss in precision caused by the data quantization. The dynamic data quantization scheme exploits a characteristic of the activation data, in that the dynamic range of a local block of activation data (i.e., corresponding to the dimensions of the convolutional kernel) is typically smaller than the dynamic range of the entire array of activation data. Accordingly, each local block of activation data is quantized independently of a neighboring block of activation data such that the bits of the quantized output are used to represent only values that lie within the more constrained local dynamic range. The dynamic data quantization scheme is similarly applied to quantize each of the convolutional kernels.

A quantized representation of a 3×3 array of m-bit activation values includes 9 n-bit mantissa values and one exponent shared between the n-bit mantissa values, with n being less than m. A quantized representation of a 3×3 kernel with p-bit parameter values includes 9 q-bit mantissa values and one exponent shared between the q-bit mantissa values, with q being less than p. Convolution of the kernel with the activation data includes computing a dot product of the 9 n-bit mantissa values with the 9 q-bit mantissa values and summing the two shared exponents. In a scenario with multiple convolutional kernels, multiple computing units (each corresponding to one of the convolutional kernels) receive the quantized representation of the 3×3 array of m-bit activation values from the same quantization-alignment module.

In one embodiment of the invention, the quantized representation of the kernels are precomputed and stored in a memory element, such that when convolution is performed during the model application (inference) phase of a CNN, the quantized representation of the kernels can be directly read from the memory element. In another embodiment, quantization of the kernels may be performed "on-the-fly", which may be necessary during the training phase of the CNN.

These and other embodiments of the invention are more fully described in association with the drawings below.

BRIEF DESCRIPTION OF THE DRAWINGS

FIGS. 5A and 5B depict a mathematical examples of the quantizer-alignment operation, in accordance with various embodiments of the invention.

DETAILED DESCRIPTION OF THE INVENTION

Figure 1A:
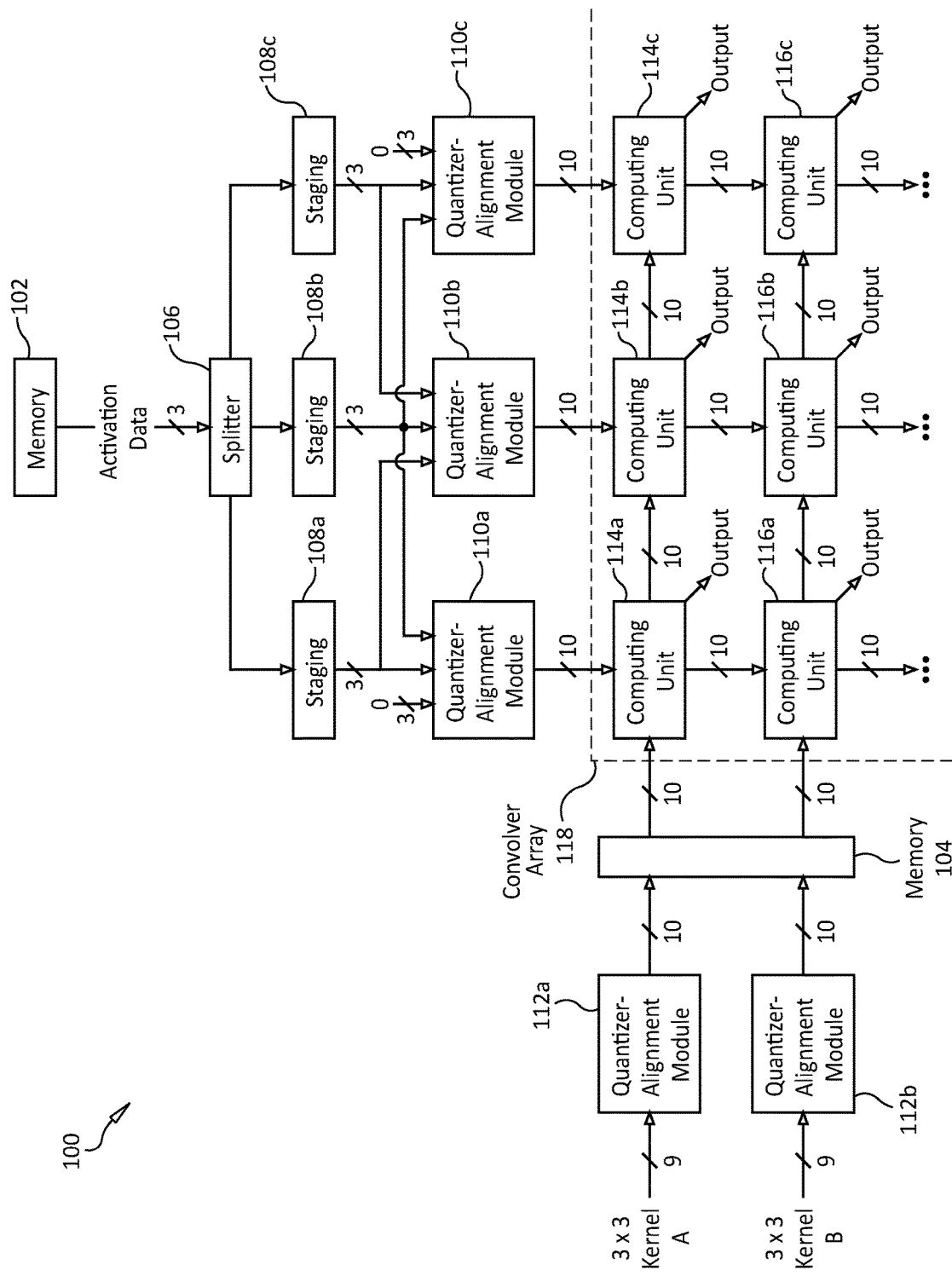
FIG. 1A depicts a hardware architecture of system configured to a convolve a plurality of kernels with activation data, in which the convolution involves computing a dot product of a quantized representation of an array (also called "a local block") of activation values with a quantized representation of a convolutional kernel, in accordance with one embodiment of the invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/steps.

Before discussing the particulars of the system for performing convolution operations, a technology overview is presented to provide a more general context in which concepts of the invention may be practiced and understood. As is known in the art, convolution is an integral mathematical operation in a convolutional neural network (CNN). A central task in convolution is the computation of a dot product between a kernel and a "local block" of activation data with dimensions that match the size of the kernel. The activation data refers to the raw input data (e.g., sensor data) or the output from a previous stage of the CNN.

For simplicity of explanation, two-dimensional kernels and in particular 3×3 kernels will be discussed, but it is understood that the concepts described herein may apply to kernels with other dimensions (e.g., 4×4, 5×5) or higher dimensional kernels (e.g., 3×3×3). In the convolution operation, the kernel is conceptually "shifted" in a horizontal and/or vertical manner with respect to the activation data, and the dot product operation is repeated for each shifted position of the kernel. While "shifting" of the kernel is useful way to visualize the convolution operation, another way to visualize the convolution operation is to place duplicated instances of the kernel at various shifted locations with respect to the activation data. The latter visualization is computationally more efficient, as it allows multiple instances of the dot product operation to be computed in parallel (i.e., at the same time). It is additionally noted that the application of the concepts described herein is not limited to a convolution operation, and could more generally be applied to the dot product or multiplication of two matrices with small matrix sizes (e.g., not more than 5×5=25 values).

An important goal of the invention is to reduce the power consumption of a CNN, as a low power design provides many advantages. First, a low power design reduces the need for heat removal components (e.g., heat sink, fan, etc.) to cool the integrated circuit in which the CNN is instantiated. Second, a low power design allows the integrated circuit that implements a convolutional network to be placed at power-constrained edge devices (e.g., camera or other image sensing device), instead of at the core device (e.g., a server, a multi-core processor) where power is more readily available. One reason for performing data analysis operations at the edge devices is that the bandwidth of sensor data received at the edge devices may be very large. As such, it may be more efficient to extract the pertinent information (e.g., identified stop sign, stop light, pedestrian, etc.) at the edge device and transmit only the pertinent information to the core device, rather than transmitting the entire stream of sensor data to the core device. The efficiencies may include a reduction in the wires needed to transmit the sensor data from the edge devices to the core device. In the context of an automobile, edge devices may be embodied as the various sensors in the automobile (e.g., image sensor in the front bumper, image sensor in the rear bumper, LiDAR sensor mounted on the roof of the automobile, etc.), whereas the core device may be a multi-core processor located in the trunk compartment of the automobile that directly draws power from the automobile battery.

In order to reduce the power consumption of a CNN, it is important to reduce the power consumption of the circuitry that performs the convolution operation, since the convolution operation is performed repeatedly by the CNN. The strategy employed herein to reduce the power consumption is to reduce the bit width of the inputs to the mathematical operators of the convolution circuitry (e.g., multipliers and adders). Bit width reduction results in the mathematical operation of quantization, with rounding and truncation being common examples of quantization. While the use of quantized inputs reduces the power consumption (as there are fewer signal transitions between logic 0 and logic 1), quantization comes with the tradeoff of a loss in numerical precision. Therefore, a specific design objective in reducing the power consumption is to quantize the inputs to the mathematical operators, and at the same time, minimize the loss in numerical precision.

A quantization scheme that satisfies this design objective in the context of convolution is dynamic data quantization. Considering the activation data at one moment in time, the activation data may be viewed as an X by Y array of values (or more generally, an X by Y by Z volume of values for three-dimensional activation data). While the dynamic range of the activation data over the entire X by Y array may be large, the dynamic range of a "local block" of the activation data that matches the kernel dimensions is typically much smaller. One can understand that the intensity levels and colors of an image are often times fairly constant locally (e.g. uniform color of the sky or color of a house), except for where edges of objects might be present. Therefore, in a dynamic data quantization scheme, each "local block" of activation values is quantized with a set number of bits to maximize the numerical precision of the (more limited) local dynamic range. It should be apparent that the numerical precision of such a scheme is improved over a quantization scheme that uses the same number of bits to represent numbers over the (larger) entire dynamic range of the X by Y array of values. The concept of dynamic data quantization will be better understood based on the examples provided below in FIGS. 5A/B and FIGS. 6A/B.

One focus of the present invention is to apply concepts of dynamic data quantization to a particular hardware architecture for convolving a plurality of kernels with activation data. One example of a convolver array 118 and additional components surrounding convolver array 118 is depicted as system 100 in FIG. 1A. At an abstract level, activation data (measured from a single moment in time) may be understood as flowing "down" in the vertical direction and kernel data from a plurality of kernels may be understood as flowing "right" in the horizontal direction. It is understood that references such as down, right, vertical and horizontal are used for convenience of explanation in the context of FIG. 1A, and may be altered depending on the physical placement and orientation of components in the hardware architecture. At each "intersection" (i.e., crossing of data paths) of the activation data and the kernel data is a computing unit (e.g., a convolver), which is configured to compute a dot product of a "local block" of activation data with a kernel. FIG. 1A is now explained in greater detail below.

FIG. 1A depicts the hardware architecture of system 100 configured to a convolve a plurality of kernels (e.g., kernel A and kernel B) with activation data, in which a central task of the convolution involves computing a dot product of a quantized representation of an array of activation values (earlier called a "local block") with a quantized representation of one of the kernels. While two kernels are illustrated in FIG. 1A for simplicity of explanation and depiction, it is understood that typically many more kernels are utilized.

Activation data is read from memory element 102, and is split into columns of activation values by splitter 106. For simplicity of explanation, the activation data consists of only 3 columns of values in the example of FIG. 1A, while more typically, activation data may include several hundred columns of values. It is expected that the reader will be able to generalize the architecture of the simplified example of FIG. 1A to the more typical column width of activation data (i.e., by replicating the "middle" column of system 100—i.e., staging 108b, quantizer-alignment module 110b, computing unit 114b, computing unit 116b).

Assuming that the activation data includes the following array A of data, $$A = \begin{bmatrix} a_{1,} & a_{1,2} & a_{1,3} \\ a_{2,1} & a_{2,2} & a_{2,3} \\ a_{3,1} & a_{3,2} & a_{3,3} \\ a_{4,1} & a_{4,2} & a_{4,3} \end{bmatrix}$$

the activation data may be provided row by row to splitter 106, and splitter 106 may split the elements of each row into individual activation values which are transmitted to one of the staging components (108a, 108b and 108c). More specifically, at one clock cycle (of a processor—not depicted), splitter 106 may receive the last row of array A, and transmit activation value, $a_{4,1}$, to staging 108a, activation value, $a_{4,2}$, to staging 108b, and activation value, $a_{4,3}$, to staging 108c. At the next clock cycle, splitter 106 may receive the second to the last row of array A, and transmit activation value, $a_{3,1}$, to staging 108a, activation value, $a_{3,2}$, to staging 108b, and activation value, $a_{3,3}$, to staging 108c, and so on. Due to this staggered delivery of the activation data to convolver array 118, the activation data may be interpreted as "flowing downwards" in the context of FIG. 1A.

Figure 2:
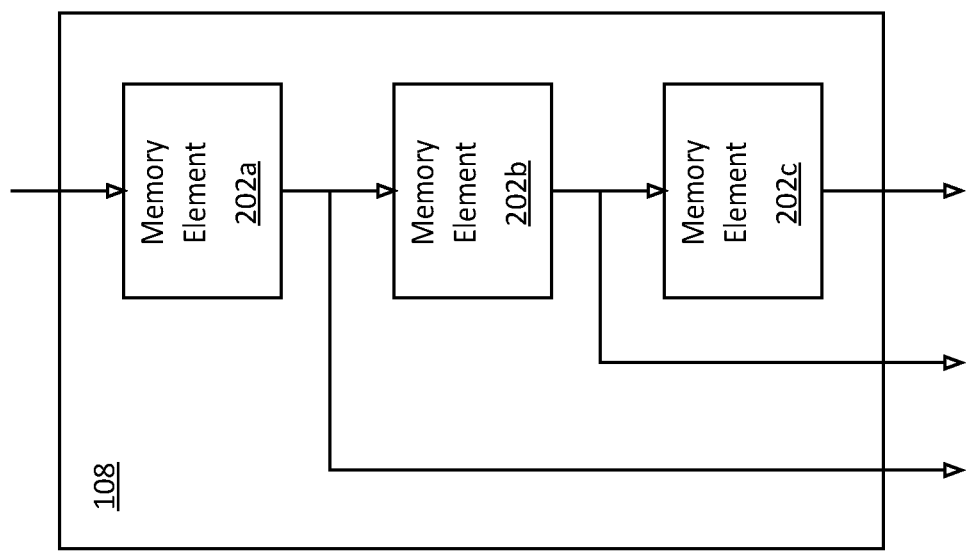
FIG. 2 depicts a circuit diagram of a splitter, in accordance with one embodiment of the invention.

Each of the staging elements 108a, 108b, 108c may be configured to output the three most recent activation values during each clock cycle (i.e., most recently received by the staging element). For example, continuing the discussion with the same array A of activation data, staging 108a may output activation value, $a_{4,1}$, 0, 0, during one clock cycle; activation values, $a_{3,1}$, $a_{4,1}$, 0, during the next clock cycle; activation values, $a_{2,1}$, $a_{3,1}$, $a_{4,1}$, during the next clock cycle; and so on (assuming that memory elements of the staging element are initialized to 0). A possible implementation of one of the staging elements is shown in FIG. 2. Staging element 108 (which may represent any of staging elements 108a, 108b, 108c) may include three memory elements 202a, 202b, 202c (e.g., three D flip-flops) connected in series. The output of each of the memory elements may be provided as an output of staging element 108.

The output of the staging elements 108a, 108b and 108c may be provided to one or more of quantizer-alignment modules 110a, 110b and 110c. The input to quantizer-alignment module 110b is the more general case and will be discussed first, followed by the respective inputs to quantizer-alignment modules 110a and 110c (which are related to boundary cases). In a clock cycle, quantizer-alignment module 110b may receive a vector of three activation values from staging element 108a, a vector of three activation values from staging element 108b, and a vector of three activation values from staging element 108c. When considered in an aggregated manner, these three vectors may form a 3 by 3 array of activation values (i.e., corresponding to the previously discussed "local block" of activation data with dimensions that correspond to the dimensions of a kernel).

For instance, continuing the discussion with the same array A of activation data, quantizer-alignment module 110b may receive $$\begin{bmatrix} a_{4,1} & a_{4,2} & a_{4,3} \\ 0 & 0 & 0 \\ 0 & 0 & 0 \end{bmatrix}$$

during one clock cycle, $$\begin{bmatrix} a_{3,1} & a_{3,2} & a_{3,3} \\ a_{4,1} & a_{4,2} & a_{4,3} \\ 0 & 0 & 0 \end{bmatrix}$$

during the next clock cycle, $$\begin{bmatrix} a_{2,1} & a_{2,2} & a_{2,3} \\ a_{3,1} & a_{3,2} & a_{3,3} \\ a_{4,1} & a_{4,2} & a_{4,3} \end{bmatrix}$$

during the next clock cycle, and so on.

In contrast to quantizer-alignment module 110b, quantizer-alignment module 110a may only receive a vector of activation values from two staging elements (i.e., 108a and 108b), and the "left" three inputs of quantizer-alignment module 110a may be hardwired to zero in a zero padding scheme (or another value in another padding scheme). Likewise, quantizer-alignment module 110c may only receive a vector of activation values from two staging elements (i.e., 108b and 108c), and the "right" three inputs may be hardwired to zero in a zero padding scheme (or another value in another padding scheme).

Figure 3:
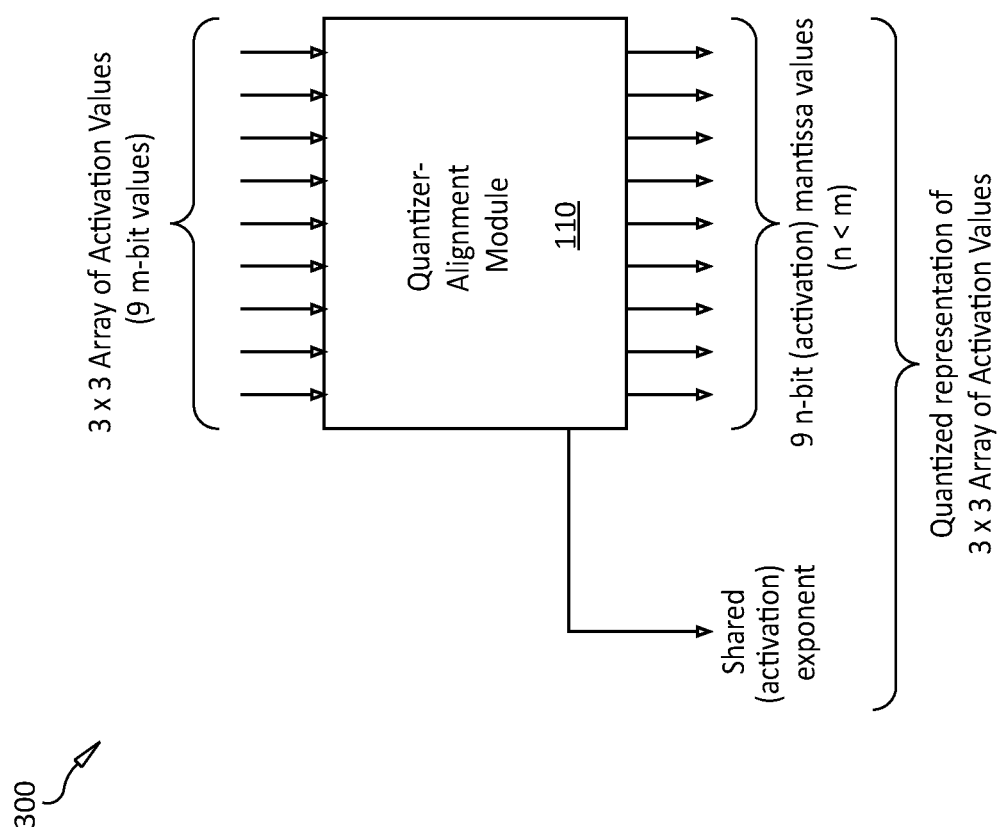
FIG. 3 depicts a block diagram with additional details regarding the input and output of a quantizer-alignment module for quantizing an array of activation values, in accordance with one embodiment of the invention.

The input and output of one of the quantizer-alignment modules is shown in greater detail in block diagram 300 of FIG. 3. As previously described, quantizer-alignment module 110 may receive a 3 by 3 array of activation values. As further specified in FIG. 3, each of the activation values may consist of m-bits. The output of quantizer-alignment module 110 may include nine n-bit mantissa values and one exponent shared by the nine n-bit mantissa values, with n being less than m. If not already apparent, n being less than m is a reflection of the previously discussed bit width reduction scheme to save power. While some overhead may be incurred due to the introduction of the shared exponent, such overhead may be negligible when considering the greater power savings offered by the reduced bit width in each of the nine activation values.

In the later discussion, the quantized representation of a kernel will have a similar representation, so for the sake of clarity, the nine n-bit mantissa values from quantizer-alignment module 110 will be occasionally referred to as nine n-bit (activation) mantissa values and the shared exponent will occasionally be referred to as a shared (activation) exponent. The meaning of the "shared" exponent and nine n-bit mantissa values will be more clearly understood in the context of the examples of FIGS. 5 and 6 below. Together, the shared exponent and the nine n-bit mantissa values form a quantized representation of the 3 by 3 array (or "local block") of activation values.

Figure 4:
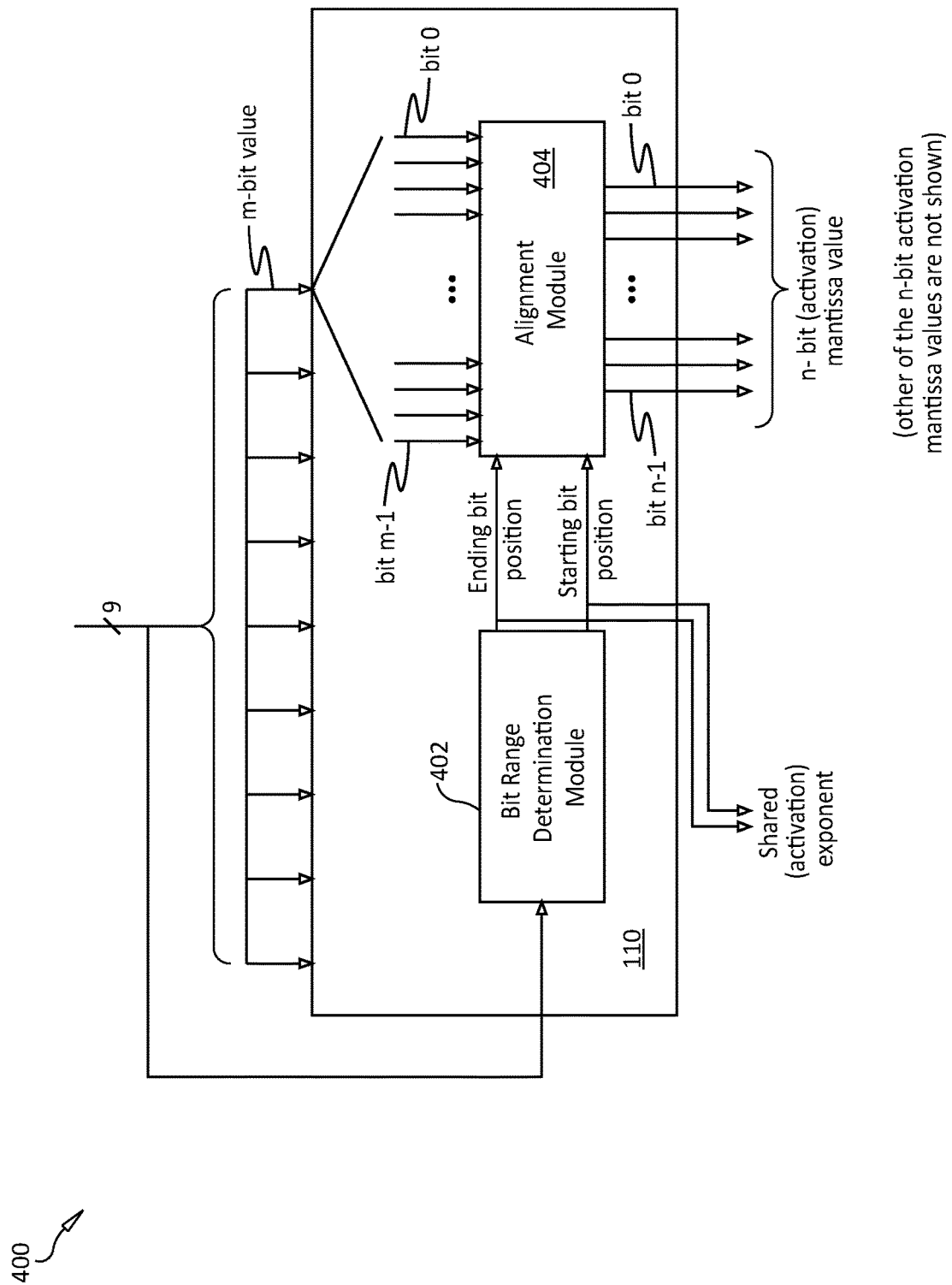
FIG. 4 depicts a block diagram with additional details of the quantizer-alignment module of FIG. 3, in accordance with one embodiment of the invention.

FIG. 4 depicts block diagram 400 with additional details of quantizer-alignment module 110, which may include bit range determination module 402 and alignment module 404. Bit range determination module 402 may determine an appropriate quantization bit range based on the nine activation values. More specifically, the quantization bit range may be based on the maximal one of the 3 by 3 array of activation values, a median one of the 3 by 3 array of activation values, and/or a spatial center of the 3 by 3 array of activation values (i.e., the value of $a_{2,2}$ from the following 3 by 3 array of activation values $$\begin{bmatrix} a_{1,1} & a_{1,2} & a_{1,3} \\ a_{2,1} & a_{2,2} & a_{2,3} \\ a_{3,1} & a_{3,2} & a_{3,3} \end{bmatrix}).$$

Even more specifically, the quantization bit range may be based on the maximum non-zero bit of a maximal one of the 3 by 3 array of activation values, the maximum non-zero bit of median one of the 3 by 3 array of activation values, and/or the maximum non-zero bit of a spatial center of the 3 by 3 array of activation values.

In most implementations, the bit width of the quantization scheme is set, so bit range determination module 402 may be used to fix the ending bit position of the quantization bit range, with the starting bit position of the quantization bit range determined as the ending bit position−the preset bit width+1. Alternatively, bit range determination module 402 may be used to fix the starting bit position of the quantization bit range, with the ending bit position of the quantization bit range determined as the starting bit position+the preset bit width−1. The starting bit position may encode the "shared exponent" as will be more clearly understood from the example in FIG. 6A below. Alternatively, the ending bit position may encode the "shared exponent" as will be more clearly understood from the example in FIG. 6B below.

The bit range may be provided to alignment module 404, which extracts bits in accordance with the determined bit range from each of the m-bit values. In the example of FIG. 4, the bit range is assumed to include n bits, so the output of alignment module 404 includes nine n-bit values (although only one of the n-bit values has been shown for ease of depiction). Intuitively, the n-bits are the n highest bits of a corresponding m-bit value if the "local block" of activation values includes one or more large values; the n-bits are the n middle bits of a corresponding m-bit value if the "local block" of activation values includes only moderate and small values; and the n-bits are the n lowest bits of a corresponding m-bit value if the "local block" of activation values includes only small values.

FIG. 5A depicts mathematical example 500 of the quantizer-alignment operation, in accordance with one embodiment of the invention. In the example of FIG. 5A, the ending bit position of the quantization bit range is determined based on the maximum non-zero bit of the maximal one of the 3 by 3 array of activation values. The maximal value is $2^{12}+2^8+2^5$, so the ending bit position is set to be 12 (corresponding to the maximum non-zero bit of $2^{12}$). Stated differently, in the example of FIG. 5A, the ending bit position of the quantization bit range is determined as the bit position of the maximum non-zero bit of all of the nine activation values.

The example uses a fixed bit width of 8 bits, so the starting bit position is 5 (i.e., 12−8+1), with bit position 5 mathematically represented as $2^5$. Further, the present quantization scheme employs truncation (as opposed to rounding), so any bits from bit positions 0-4 are omitted (without influencing the value of the bit at bit position 5). Based on such quantization bit range (i.e., preserving bits 5 through 12), activation value, $2^{11}+2^8+2^2$, may be quantized as $2^{11}+2^8$; activation value $2^{12}+2^8+2^5$ may remain unchanged as all bits thereof are within the quantization bit range; and so on.

After the quantization operation in FIG. 5A, the exponent represented by the starting bit position from the quantization bit range may be factored out of each of the quantized values (which in a circuit level implementation, may correspond to a "bit alignment" or "bit shifting" operation). In the example of FIG. 5A, quantized value $2^{11}+2^8$ may be factored as $2^5(2^6+2^3)$; quantized value $2^{12}+2^8+2^5$ may be factored as $2^5(2^7+2^3+2^0)$; and so on. As $2^5$ is common to all the factored expressions, $2^5$ (or just "5") may be mathematically referred to as the shared exponent.

To summarize the quantization-alignment operation using the example provided in FIG. 5A, the following nine 13-bit activation values, $2^{11}+2^8+2^2$ $2^{12}+2^8+2^5$ $2^{10}+2^5+2^1$ $2^9+2^7+2^6$ $2^6+2^5$ $2^3+2^0$ $2^{12}+2^3$ $2^7+2^5+2^0$ $2^{10}+2^8$ may be transformed, via the quantization-alignment module 110, into the shared (activation) exponent $2^5$ and the following nine 8-bit (activation) mantissa values, $2^6+2^3$ $2^7+2^3+2^0$ $2^5+2^0$ $2^4+2^2+2^1$ $2^1+2^0$

0

$2^7$ $2^2+2^0$ $2^5+2^3$

The mathematical example 550 presented in FIG. 5B illustrates that there is some flexibility in the choice of the shared exponent. Whereas in FIG. 5A, the shared exponent was chosen as the exponent representing the starting position of the quantization range (i.e., $2^5$), the shared exponent in FIG. 5B is chosen as the exponent representing the ending position of the quantization range (i.e., $2^{12}$). As will be more apparent in FIGS. 6A and 6B below, the choice of the shared exponent will affect the mathematical value represented by each of the bits of the mantissa values. At a high level, it may be understood that either choice for the shared exponent is satisfactory so long as an internal "bookkeeping" keeps track of the choice of the shared exponent (whether it is the starting or ending bit position).

Figure 6A:
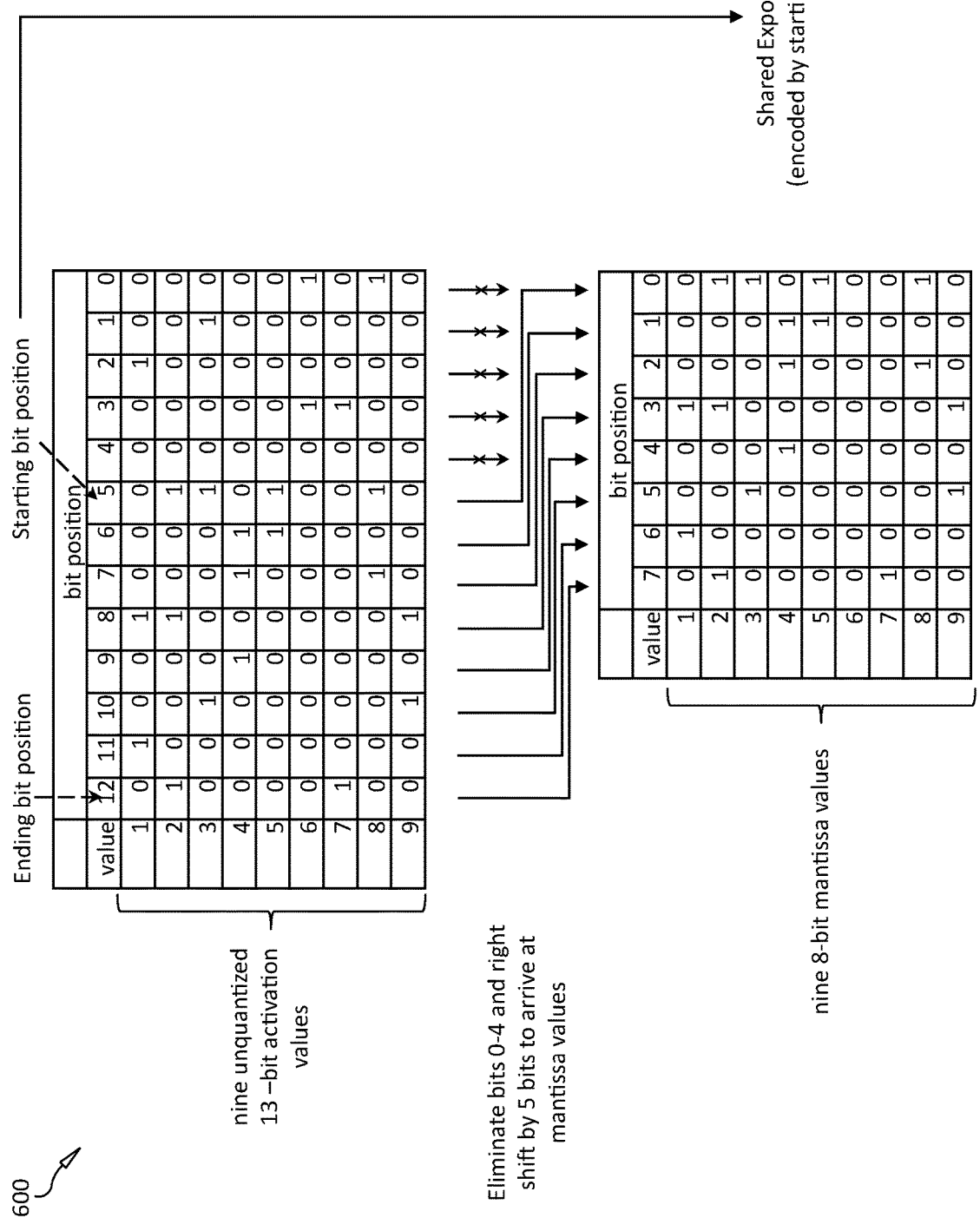
FIGS. 6A and 6B depict bit-level examples of the quantizer-alignment operation, in accordance with various embodiments of the invention.

The bit-level (or circuit-level) example 600 in FIG. 6A illustrates that the quantization step may be performed by eliminating existing bits 0-4 and the alignment step may be performed by shifting existing bits 5 through 12 to new bit positions 0 through 7, respectively. If not already apparent, the upper table of bit values numerically corresponds to the nine 13-bit activation values shown in the left-most column of FIG. 5A, and the lower table of bit values numerically corresponds to the nine 8-bit mantissa values shown in the right-most column of FIG. 5A. While not notated in FIG. 6A, the "internal bookkeeping" keeps track that for each of the 8-bit mantissa values (see lower table of FIG. 6A), bit position 0 corresponds to the exponent $2^0$, bit position 1 corresponds to the exponent $2^1$, ..., and bit position 7 corresponds to the exponent $2^7$ (i.e., compare "after alignment column" of FIG. 5A and lower table of FIG. 6A). In other words, for this particular choice of the shared exponent, there is no change in the mathematical values represented by each of the bits when each of the 13-bit values is transformed into the corresponding 8-bit mantissa value. As will be described in FIG. 6B, this mapping for the bit positions of the 8-bit mantissa may be different depending on the choice of the shared exponent.

Additionally, it is noted that the number of eliminated bits (i.e., the number of bit shifts) illustrated in FIG. 6A is dependent on the particular activation values. Due to the dynamic data quantization scheme, the number of bit shifts is expected to be different for another group of nine activation values.

Figure 6B:
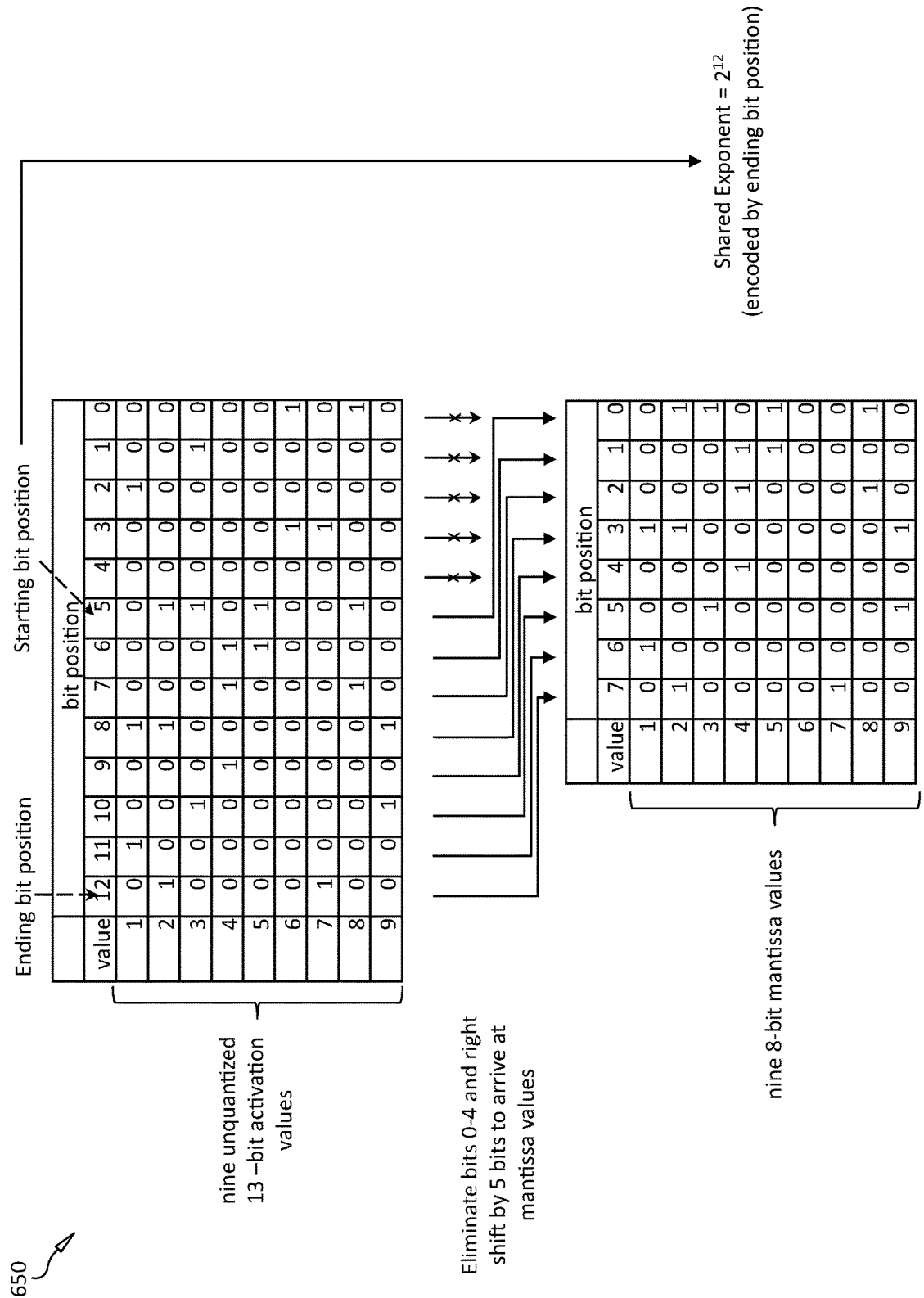

The bit-level example 650 in FIG. 6B is substantially similar to the example in FIG. 6A, except that the shared exponent is chosen as the ending bit position of the quantization range. As is apparent from FIG. 6B, the only difference between FIGS. 6A and 6B is the choice in the shared exponent. The implication of the choice of the shared exponent in FIG. 6B is that, for each of the 8-bit mantissa values (compare "after alignment column" of FIG. 5B and lower table of FIG. 6B), bit position 0 corresponds to the exponent $2^{-7}$, bit position 1 corresponds to the exponent $2^{-6}$, ..., and bit position 7 corresponds to the exponent $2^0$. Again, this mapping is taken into account in the "internal bookkeeping". In the example of FIG. 6B, it should be apparent that the mapping from bits to numerical values for the 13-bit values differs from the mapping from bits to numerical values for the 8-bit mantissa values.

Figure 7:
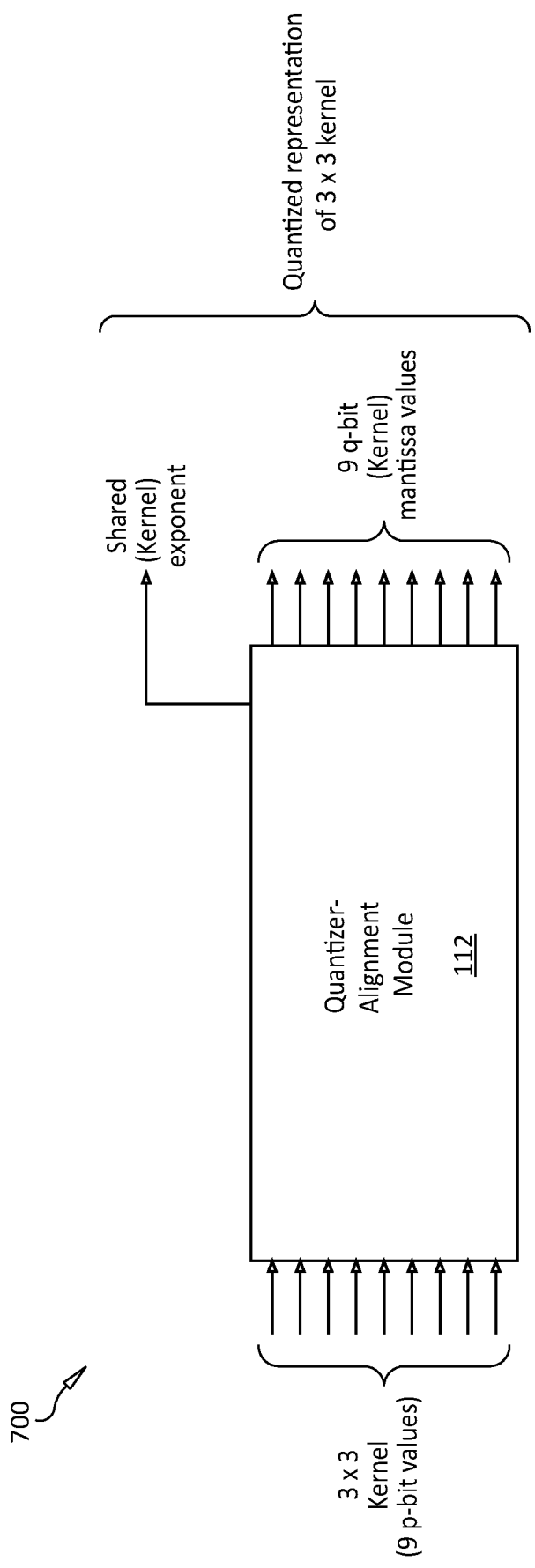
FIG. 7 depicts a block diagram with additional details regarding the input and output of a quantizer-alignment module for quantizing a convolutional kernel, in accordance with one embodiment of the invention.

FIG. 7 depicts block diagram 700 of quantizer-alignment module 112 that may represent any of quantizer-alignment modules (e.g., 112a, 112b) used to transform a 3×3 kernel into its quantized representation. The input of quantizer-alignment module 112 may include 9 p-bit values, and the output of quantizer-alignment module 112 may include 9 q-bit (kernel) mantissa values (with q being less than p) and one (kernel) exponent shared by the mantissa values, which in combination form the quantized representation of the 3×3 kernel. The internal details and operations of quantizer alignment module 112 may be analogous to quantizer-alignment module 110, so for conciseness of explanation, no additional details are provided in conjunction with the quantizer-alignment module 112 depicted in FIG. 7.

Figure 8A:
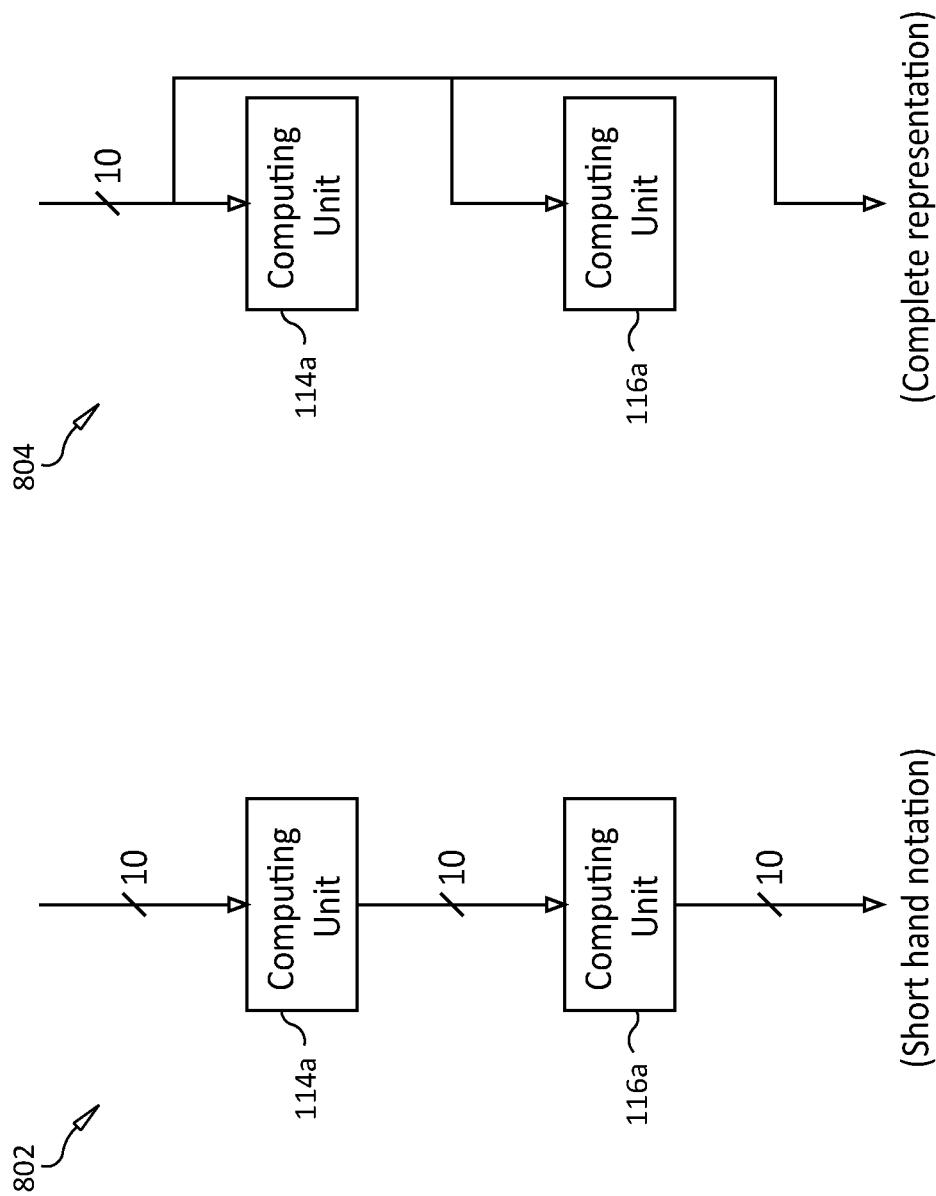
FIG. 8A depicts a block diagram with additional details of the "vertical" electrical interconnections associated with the computing units, in accordance with one embodiment of the invention.

FIG. 8A expands upon the short-hand notation used in FIG. 1A. In FIG. 1A (and also duplicated in circuit diagram 802 in FIG. 8A), ten "vertical" input signals (which correspond to the shared exponent and nine n-bit mantissa values from quantizer-alignment module 110a) are received as input by computing unit 114a. The notation in FIG. 1A might initially give the impression that computing unit 114a generates ten output signals, which are then provided to computing unit 116a, which then outputs another ten output signals, but this is not so.

The complete representation (i.e., the complete electrical interconnection) of the shorthand notation is shown in circuit diagram 804 of FIG. 8A. In actuality, the ten output signals from quantizer-alignment module 110a are provided to each of the computing units (i.e., 114a and 116a) that are spatially located in the same "column" as quantizer alignment module 110a. In the context of FIG. 1A, the output of quantizer-alignment module 110a is provided to computing unit 114a, computing unit 116a, and other computing units in the "first column" (not depicted in FIG. 1A); the output of quantizer-alignment module 110b is provided to computing unit 114b, computing unit 116b, and other computing units in the "second column" (not depicted in FIG. 1A); and the output of quantizer-alignment module 110c is provided to computing unit 114c, computing unit 116c, and other computing units in the "third column" (not depicted in FIG. 1A).

It is noted that the output of one quantizer-alignment module being propagated to multiple computing units located along the same column is a circuit-level optimization employed in one embodiment of the invention. Such a design is vastly more efficient (in terms of reducing power consumption and chip real estate) than if the quantizer-alignment module had been duplicated for each of the computing units in the same column (i.e., one instance of quantizer-alignment module 110a for computing unit 114a, another instance of quantizer-alignment module 110a for computing unit 116a, and so on).

Figure 8B:
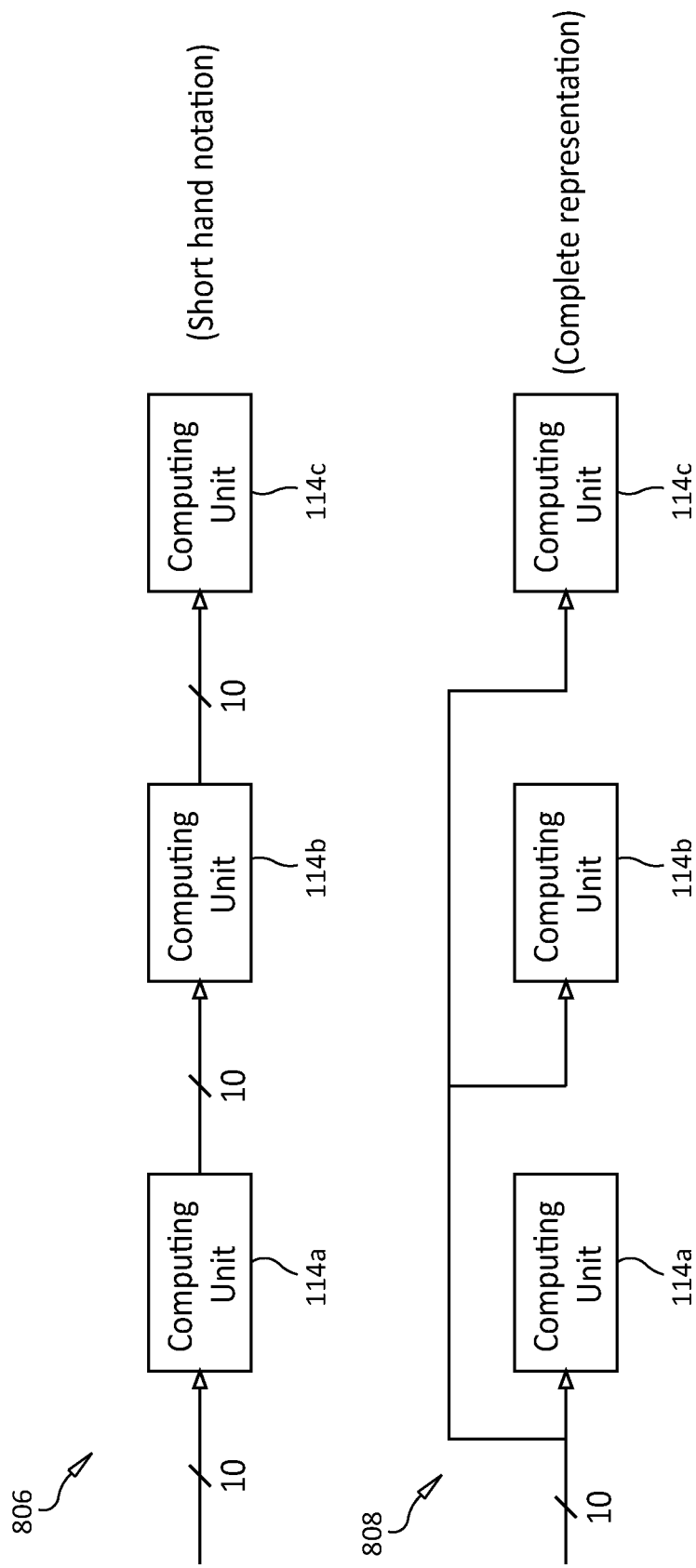
FIG. 8B depicts a block diagram with additional details of the "horizontal" electrical interconnections associated with the computing units, in accordance with one embodiment of the invention.

FIG. 8B further expands upon similar short-hand notation used in FIG. 1A. In FIG. 1A (and also duplicated in circuit diagram 806 in FIG. 8B), ten "horizontal" input signals (which correspond to the shared exponent and nine q-bit mantissa values from quantizer-alignment module 112a) are additionally received as input by computing unit 114a. The notation in FIG. 1A might initially give the impression that computing unit 114a generates ten output signals, which are then provided to computing unit 114b; and computing unit 114b generates ten output signals, which are then provided to computing unit 114c, but this is not so.

The complete representation (i.e., the complete electrical interconnection) of the shorthand notation is shown in circuit diagram 808 of FIG. 8B. In actuality, the ten output signals from quantizer-alignment module 112a are provided to each of the computing units (i.e., 114a, 114b and 114c) that are spatially located in the same "row" as quantizer alignment module 112a. In the context of FIG. 1A, the output of quantizer-alignment module 112a is provided to computing units 114a, 114b and 114c; the output of quantizer-alignment module 112b is provided to computing units 116a, 116b and 166c; and similarly for other rows not depicted in FIG. 1A.

It is noted that the output of one quantizer-alignment being propagated to multiple computing units located along the same row is also a circuit-level optimization employed in one embodiment of the invention. Such a design is vastly more efficient (in terms of reducing power consumption and chip real estate) than if the quantizer-alignment module had been duplicated for each of the computing units in the same row (i.e., one instance of quantizer-alignment module 112a for computing unit 114a, another instance of quantizer-alignment module 112a for computing unit 114b, another instance of quantizer-alignment module 112a for computing unit 114c, and so on).

Figure 1B:
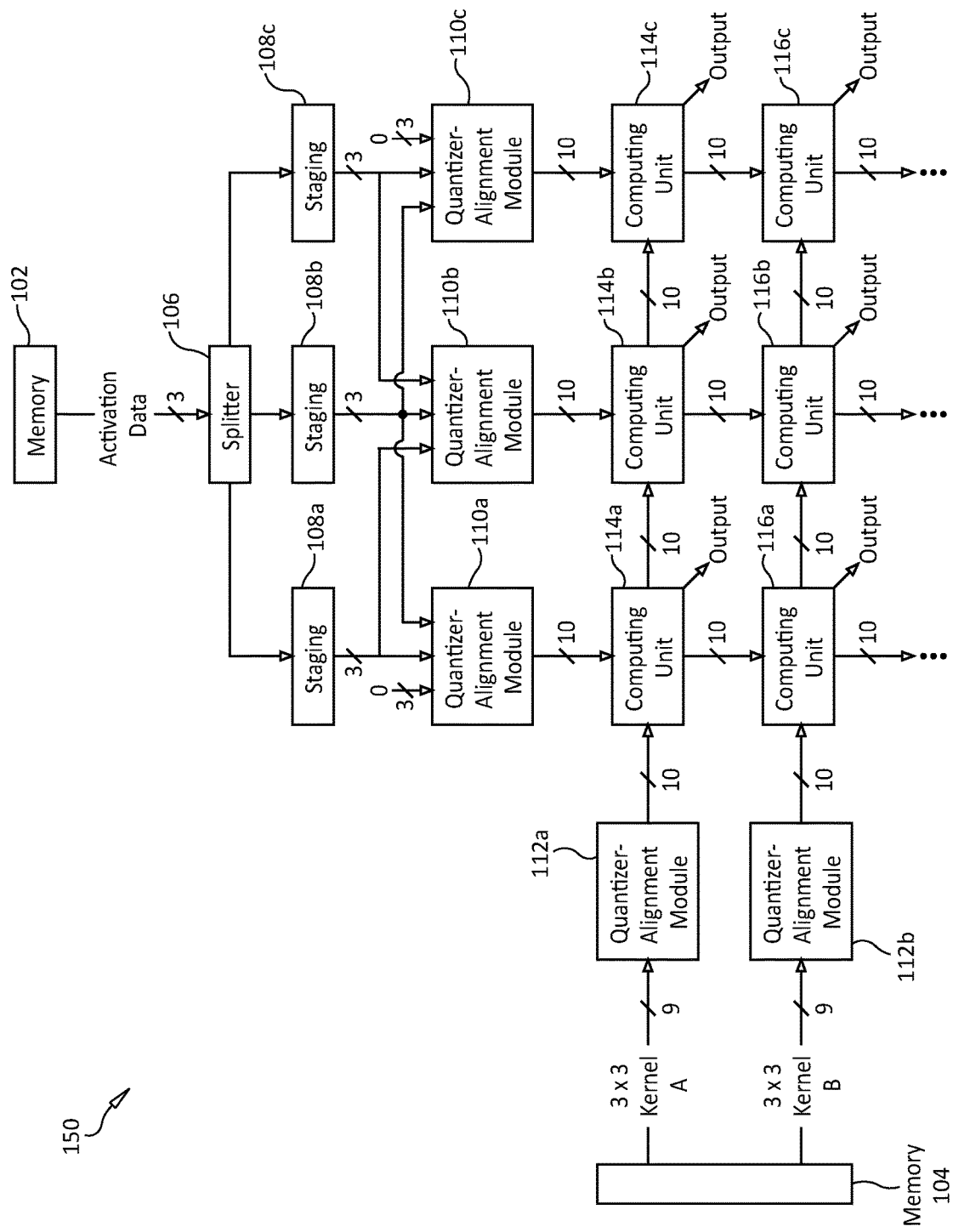
FIG. 1B depicts a variation of the hardware architecture depicted in FIG. 1A, in accordance with one embodiment of the invention.
Figure 9:
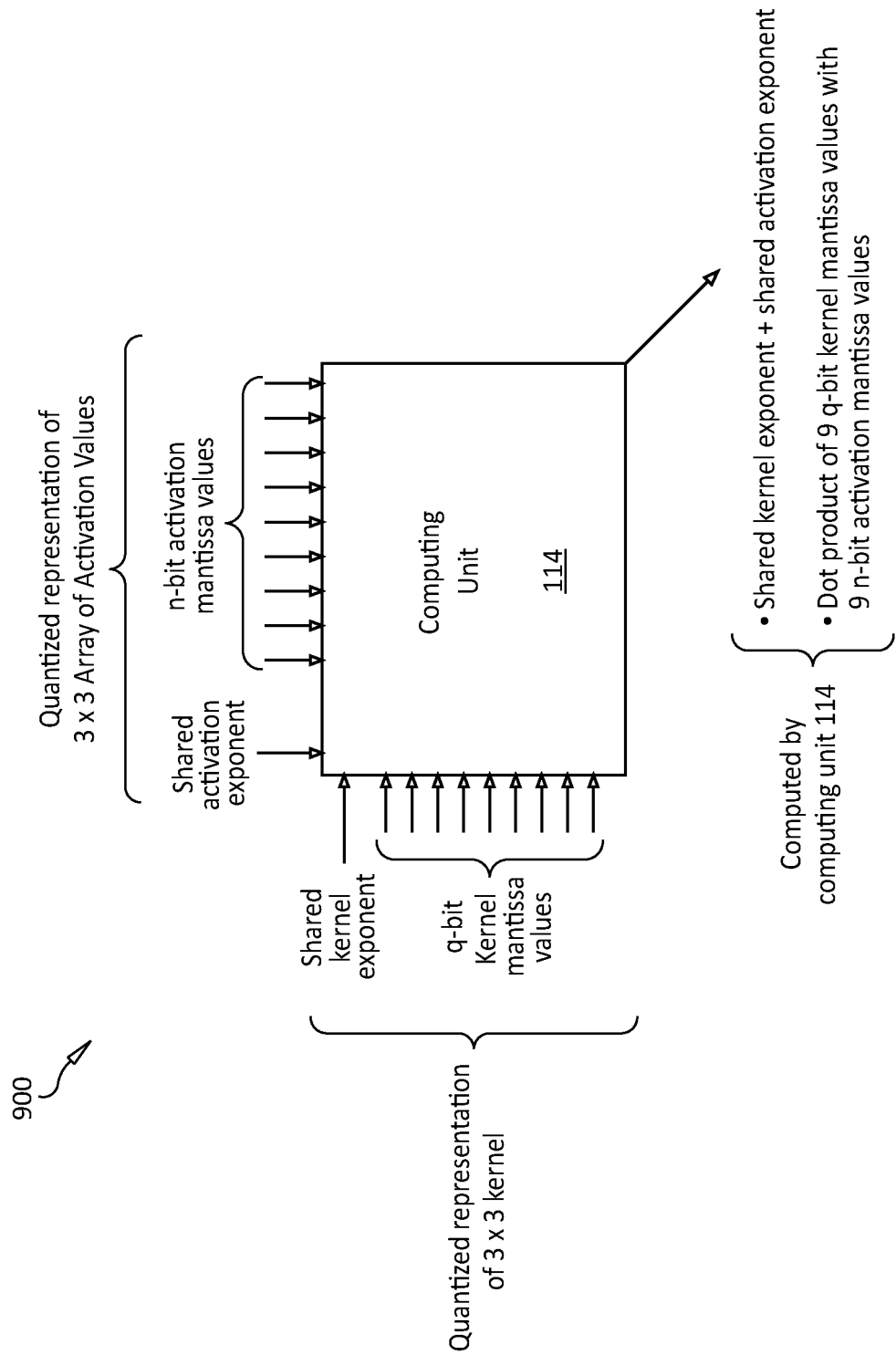
FIG. 9 depicts a block diagram with additional details regarding the input and output of a computing unit, in accordance with one embodiment of the invention.

FIG. 9 depicts block diagram 900 with additional details regarding the input and output of the computing units depicted in FIGS. 1A and 1B. As shown in FIG. 9, computing unit 114 may receive as input a quantized representation of a 3×3 array of activation values (including a shared activation exponent and 9 n-bit activation mantissa values) and a quantized representation of a 3×3 kernel (including a shared kernel exponent and 9 q-bit kernel mantissa values). An adder of computing unit 114 may compute the sum of the shared activation exponent and the shared kernel exponent. Furthermore, multipliers and adders of computing unit 114 may compute the dot product of the 9 n-bit activation mantissa values with the 9 q-bit kernel mantissa values.

Figure 10A:
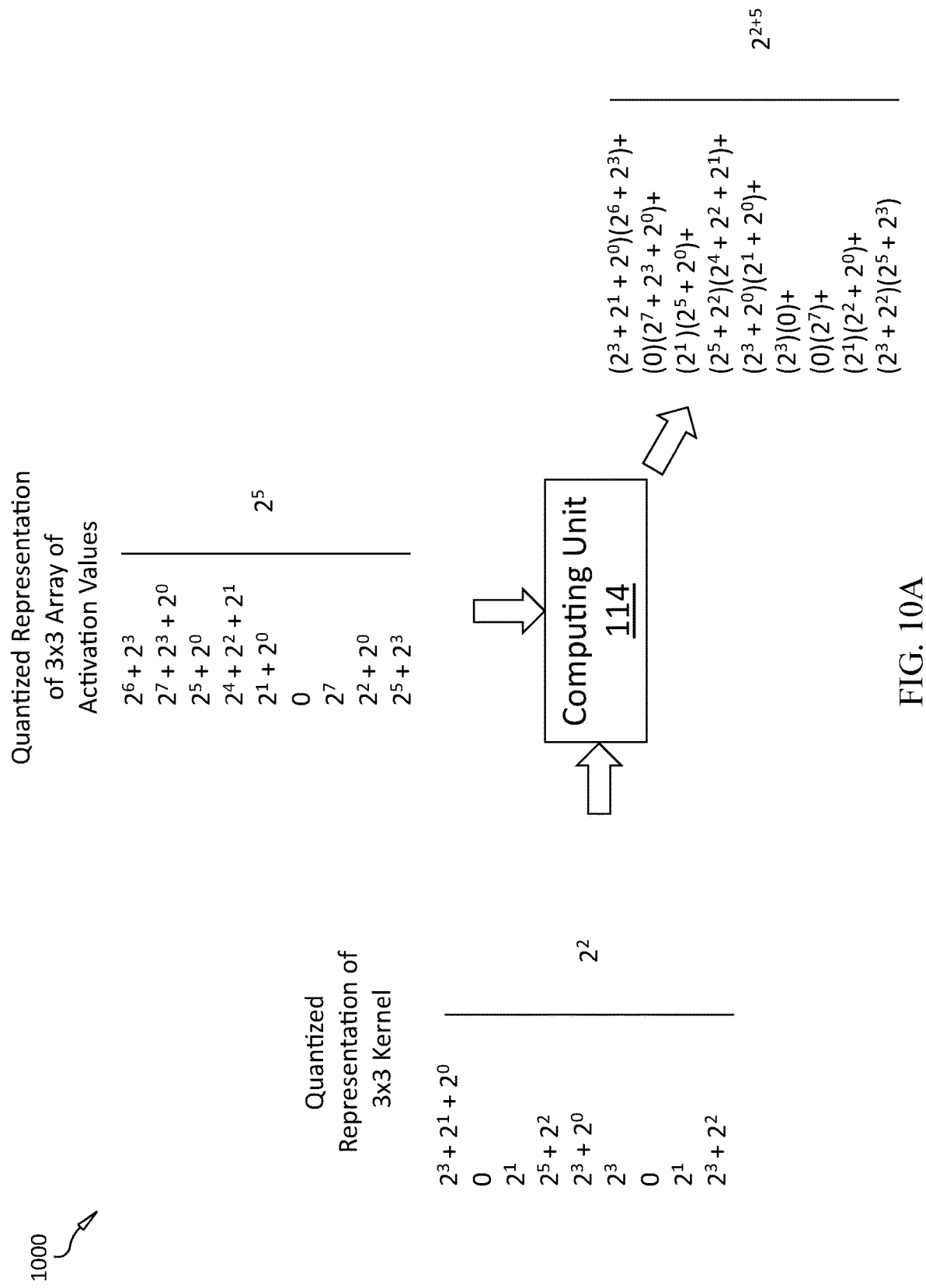
FIGS. 10A and 10B depict mathematical examples of the computation of a dot product of a quantized representation of an array of activation values with a quantized representation of a convolutional kernel, in accordance with various embodiments of the invention.

FIG. 10A depicts mathematical example 1000 of the computation of a dot product of a quantized representation of an array of activation values with a quantized representation of a convolutional kernel (in which the shared exponents are chosen as the starting bit positions of the respective quantization ranges for the kernel and activation values). In the mathematical example, the quantized representation of the array of activation values includes $2^6+2^3$ $2^7+2^3+2^0$ $2^5+2^0$ $2^4+2^2+2^1$ $2^1+2^0$ $0$ $2^7$ $2^2+2^0$ $2^5+2^3$ with the shared exponent of $2^5$. The quantized representation of the 3×3 kernel includes $2^3+2^1+2^0$ $0$ $2^1$ $2^5+2^2$ $2^3+2^0$ $2^3$ $0$ $2^1$ $2^3+2^2$ with the shared exponent of $2^2$.

Computing unit 114 computes the dot product of the two quantized representations as follows:

$(2^3+2^1+2^0)(2^6+2^3)+$ $(0)(2^7+2^3+2^0)+$ $(2^1)(2^5+2^0)+$ $(2^5+2^2)(2^4+2^2+2^1)+$ $(2^3+2^0)(2^1+2^0)+$ $(2^3)(0)+$ $(0)(2^7)+$ $(2^1)(2^2+2^0)+$ $(2^3+2^2)(2^5+2^3)$

A sum is computed of the shared activation exponent and the shared mantissa exponent as follows: 2+5 (which represents the exponent, $2^{2+5}$).

Figure 10B:
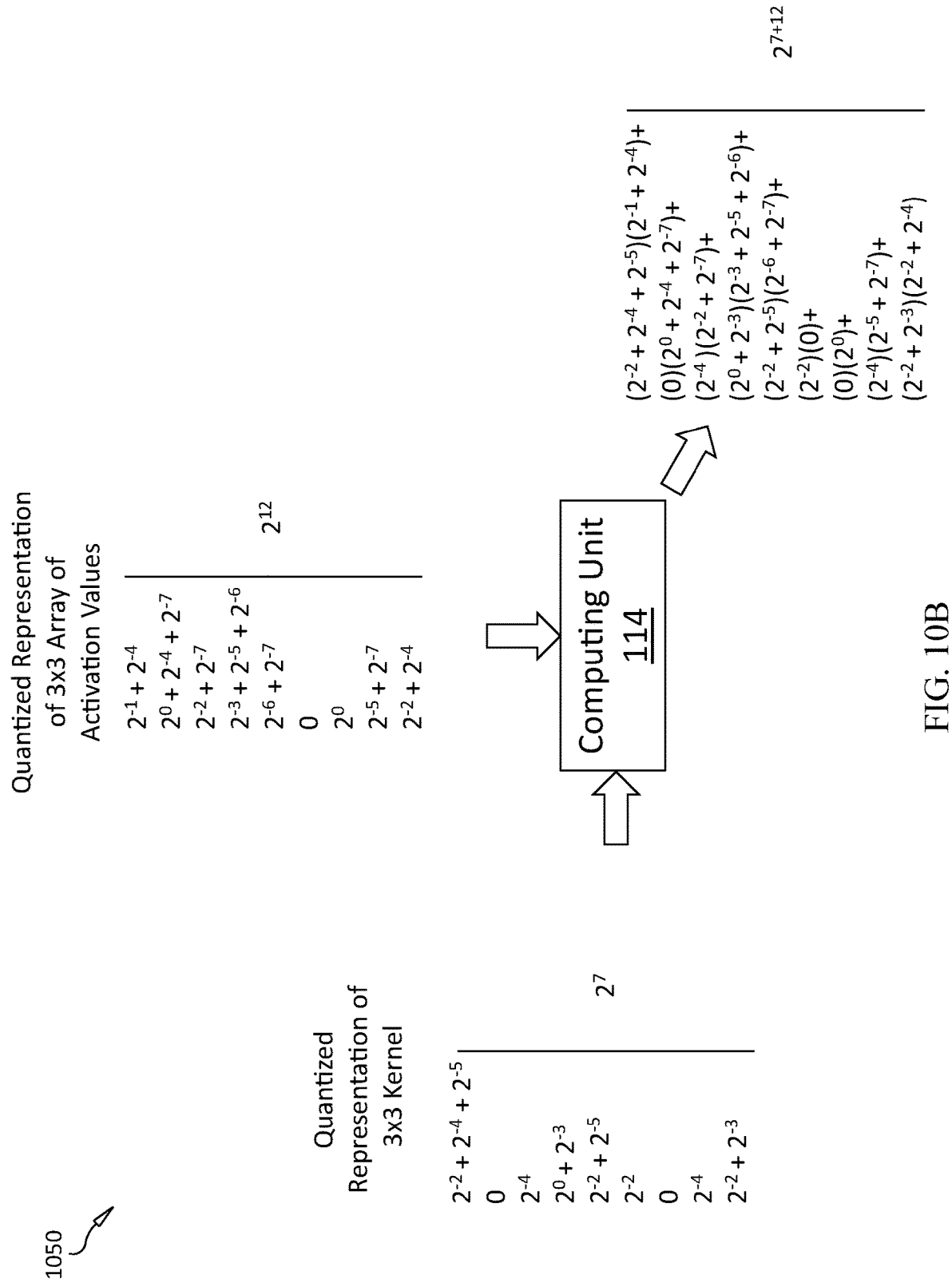

FIG. 10B depicts mathematical example 1050 of the computation of a dot product of a quantized representation of an array of activation values with a quantized representation of a convolutional kernel (in which the shared exponents are chosen as the ending bit positions of the respective quantization ranges for the kernel and activation values). In the mathematical example, the quantized representation of the array of activation values includes $2^{-1}+2^{-4}$ $2^0+2^{-4}+2^{-7}$ $2^{-2}+2^{-7}$ $2^{-3}+2^{-5}+2^{-6}$ $2^{-6}+2^{-7}$ $0$ $2^0$ $2^{-5}+2^{-7}$ $2^{-2}+2^{-4}$ with the shared exponent of $2^{12}$. The quantized representation of the 3×3 kernel includes $2^{-2}+2^{-4}+2^{-5}$ $0$ $2^{-4}$ $2^0+2^{-3}$ $2^{-2}+2^{-5}$ $2^{-2}$ $0$ $2^{-4}$ $2^{-2}+2^{-3}$ with the shared exponent of $2^7$.

Computing unit 114 computes the dot product of the two quantized representations as follows:

$(2^{-2}+2^{-4}+2^{-5})(2^{-1}+2^{-4})+$ $(0)(2^0+2^{-4}+2^{-7})+$ $(2^{-4})(2^{-2}+2^{-7})+$ $(2^0+2^{-3})(2^{-3}+2^{-5}+2^{-6})+$ $(2^{-2}+2^{-5})(2^{-6}+2^{-7})+$ $(2^{-2})(0)+$ $(0)(2)+$ $(2^{-4})(2^{-5}+2^{-7})+$ $(2^{-2}+2^{-3})(2^{-2}+2^{-4})$

A sum is computed of the shared activation exponent and the shared mantissa exponent as follows: 7+12 (which represents the exponent, $2^{7+12}$).

In system 100 depicted in FIG. 1A, the quantized representations of the kernels may be precomputed prior to the model application (inference) phase and stored in memory element 104. During the convolution computation of the model application phase, the computing units may receive the precomputed quantized representations of the kernels directly from memory element 104. Using precomputed quantized representations of the kernels advantageously allows the circuit chip to focus its resources on other computations (e.g., convolution operations), during the model application phase.

In contrast, the hardware architecture of system 150 depicted in FIG. 1B may be used during the training phase, when parameters of the kernels are being adjusted and precomputation of the quantized representations of the kernels is not possible. During the training phase, a kernel with updated parameters may be stored in memory element 104; the kernel may be read from memory element 104; its quantized representation may be computed by quantizer-alignment module 112a; and the quantized representation of the kernel may be received by the computing units 114a/b/c from quantizer-alignment module 112a (in order to compute the convolution of the activation data with the kernel).

While not previously discussed, it is noted that the dot product computed by each computing unit may be temporarily stored in the respective computing unit and accumulated with the dot product from other "channels" of the activation data. Activation data with multiple channels may be present when the activation data is three-dimensional (e.g., one channel corresponding to data sensed by a red light sensor, one channel corresponding to data sensed by a green light sensor and one channel corresponding to the data sensed by a blue light sensor). In such a scenario, a kernel may have dimensions 3×3×3, comprising a 3×3 red kernel, a 3×3 green kernel and a 3×3 blue kernel. In the convolution operation, the dot product of the 3×3 red kernel with a corresponding block of activation data may be summed with the dot product of the 3×3 green kernel with the same block of activation data, and further summed with the dot product of the 3×3 blue kernel with the same block.

While dynamic data quantization was applied to both the activation data and the kernel data in the examples above, this is not necessarily true in all embodiments. In an alternative embodiment, dynamic data quantization may be applied to only the activation data and the kernel data may be unquantized or statically quantized (i.e., in a data independent manner).

Thus, a low power hardware architecture for a convolutional neural network has been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A system, comprising:
a first computing unit configured to:
receive a first plurality of quantized activation values represented by a first plurality of activation mantissa values and a first activation exponent shared by the first plurality of activation mantissa values, wherein the first plurality of quantized activation values is a quantized representation of a first matrix with values;
receive a first quantized convolutional kernel represented by a first plurality of kernel mantissa values and a first kernel exponent shared by the first plurality of kernel mantissa values;
compute a first dot product of the first plurality of activation mantissa values and the first plurality of kernel mantissa values; and
compute a first sum of the first shared activation exponent and the first shared kernel exponent;
a second computing unit configured to:
receive the first plurality of quantized activation values;
receive a second quantized convolutional kernel represented by a second plurality of kernel mantissa values and a second kernel exponent shared by the second plurality of kernel mantissa values;
compute a second dot product of the first plurality of activation mantissa values and the second plurality of kernel mantissa values; and
compute a second sum of the first shared activation exponent and the second shared kernel exponent;
a third computing unit configured to:
receive a second plurality of quantized activation values represented by a second plurality of activation mantissa values and a second activation exponent shared by the second plurality of activation mantissa values, wherein the second plurality of quantized activation values is a quantized representation of a second matrix with values wherein six of the values of the first matrix are identical to six of the values of the second matrix;
receive the first quantized convolutional kernel;
compute a third dot product of the second plurality of activation mantissa values and the first plurality of kernel mantissa values; and
compute a third sum of the second shared activation exponent and the first shared kernel exponent; and
a fourth computing unit configured to:
receive the second plurality of quantized activation values;
receive the second quantized convolutional kernel;
compute a fourth dot product of the second plurality of activation mantissa values and the second plurality of kernel mantissa values; and
compute a fourth sum of the second shared activation exponent and the second shared kernel exponent,
wherein the first plurality of quantized activation values are received by the first and second computing units, but not by the third and fourth computing units,
wherein the second plurality of quantized activation values are received by the third and fourth computing units, but not by the first and second computing units,
wherein the first quantized convolutional kernel is received by the first and third computing units, but not by the second and fourth computing units, and
wherein the second quantized convolutional kernel is received by the second and fourth computing units, but not by the first and third computing units.

2. The system of claim 1, wherein the first quantized convolutional kernel is received from a memory element during a model application phase.

3. The system of claim 1, wherein the first quantized convolutional kernel is a 3 by 3 kernel.

4. A system, comprising:
a first computing unit configured to:
receive a first plurality of quantized activation values represented by a first plurality of activation mantissa values and a first activation exponent shared by the first plurality of activation mantissa values, wherein the first plurality of quantized activation values is a quantized representation of a first matrix with values $$\begin{bmatrix} a_{1,1} & a_{1,2} & a_{1,3} \\ a_{2,1} & a_{2,2} & a_{2,3} \\ a_{3,1} & a_{3,2} & a_{3,3} \end{bmatrix};$$

receive a first quantized convolutional kernel represented by a first plurality of kernel mantissa values and a first kernel exponent shared by the first plurality of kernel mantissa values;
compute a first dot product of the first plurality of activation mantissa values and the first plurality of kernel mantissa values; and
compute a first sum of the first shared activation exponent and the first shared kernel exponent; and
a second computing unit configured to:
receive a second plurality of quantized activation values represented by a second plurality of activation mantissa values and a second activation exponent shared by the second plurality of activation mantissa values, wherein the second plurality of quantized activation values is a quantized representation of a second matrix with values $$\begin{bmatrix} a_{1,2} & a_{1,3} & a_{1,4} \\ a_{2,2} & a_{2,3} & a_{2,4} \\ a_{3,2} & a_{3,3} & a_{3,4} \end{bmatrix},$$

wherein six of the values of the first matrix are identical to six of the values of the second matrix;
receive the first quantized convolutional kernel;
compute a second dot product of the second plurality of activation mantissa values and the first plurality of kernel mantissa values; and
compute a second sum of the second shared activation exponent and the first shared kernel exponent.

5. A system, comprising:
a first computing unit configured to:
receive a first plurality of quantized activation values represented by a first plurality of activation mantissa values and a first activation exponent shared by the first plurality of activation mantissa values, wherein the first plurality of quantized activation values is a quantized representation of a first matrix with values $$\begin{bmatrix} a_{2,1} & a_{2,2} & a_{2,3} \\ a_{3,1} & a_{3,2} & a_{3,3} \\ a_{4,1} & a_{4,2} & a_{4,3} \end{bmatrix};$$

receive a first quantized convolutional kernel represented by a first plurality of kernel mantissa values and a first kernel exponent shared by the first plurality of kernel mantissa values;
compute a first dot product of the first plurality of activation mantissa values and the first plurality of kernel mantissa values;
compute a first sum of the first shared activation exponent and the first shared kernel exponent;
receive a second plurality of quantized activation values represented by a second plurality of activation mantissa values and a second activation exponent shared by the second plurality of activation mantissa values, wherein the second plurality of quantized activation values is a quantized representation of a second matrix with values $$\begin{bmatrix} a_{1,1} & a_{1,2} & a_{1,3} \\ a_{2,1} & a_{2,2} & a_{2,3} \\ a_{3,1} & a_{3,2} & a_{3,3} \end{bmatrix},$$

wherein six of the values of the first matrix are identical to six of the values of the second matrix;
compute a second dot product of the second plurality of activation mantissa values and the first plurality of kernel mantissa values; and
compute a second sum of the second shared activation exponent and the first shared kernel exponent; and
a second computing unit configured to:
receive the first plurality of quantized activation values;
receive a second quantized convolutional kernel represented by a second plurality of kernel mantissa values and a second kernel exponent shared by the second plurality of kernel mantissa values;
compute a third dot product of the first plurality of activation mantissa values and the second plurality of kernel mantissa values;
compute a third sum of the first shared activation exponent and the second shared kernel exponent;
receive the second plurality of quantized activation values;
compute a fourth dot product of the second plurality of activation mantissa values and the second plurality of kernel mantissa values; and
compute a fourth sum of the second shared activation exponent and the second shared kernel exponent.

* * * * *

UNITED STATES PATENT AND TRADEMARK OFFICE
CERTIFICATE OF CORRECTION

PATENT NO. : 11,915,126 B2
APPLICATION NO. : 16/948164
DATED : February 27, 2024
INVENTOR(S) : Jian hui Huang et al.

Page 1 of 1

It is certified that error appears in the above-identified patent and that said Letters Patent is hereby corrected as shown below:

In the Claims

At Column 14, Line 2 (Claim 1), immediately after the word "values" insert:

$$-- \begin{bmatrix} a_{1,1} & a_{1,2} & a_{1,3} \\ a_{2,1} & a_{2,2} & a_{2,3} \\ a_{3,1} & a_{3,2} & a_{3,3} \end{bmatrix} --$$

At Column 14, Line 31 (Claim 1), immediately after the phrase "second matrix with values" insert:

$$-- \begin{bmatrix} a_{1,2} & a_{1,3} & a_{1,4} \\ a_{2,2} & a_{2,3} & a_{2,4} \\ a_{3,2} & a_{3,3} & a_{3,4} \end{bmatrix}, --$$

Signed and Sealed this
Twenty-fourth Day of June, 2025

Coke Morgan Stewart
*Acting Director of the United States Patent and Trademark Office*